United States Patent
Bender et al.

(10) Patent No.: US 10,978,066 B2
(45) Date of Patent: Apr. 13, 2021

(54) ANALYZING INFORMATION TO PROVIDE TOPIC AVOIDANCE ALERTS

(71) Applicant: INTERNATIONAL BUSINESS MACHINES CORPORATION, Armonk, NY (US)

(72) Inventors: Michael Bender, Rye Brook, NY (US); Kulvir S. Bhogal, Fort Worth, TX (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 16/242,492

(22) Filed: Jan. 8, 2019

(65) Prior Publication Data
US 2020/0219500 A1    Jul. 9, 2020

(51) Int. Cl.
*H04M 3/42*    (2006.01)
*G10L 15/22*    (2006.01)
(Continued)

(52) U.S. Cl.
CPC .......... *G10L 15/22* (2013.01); *G06F 16/9035* (2019.01); *G06F 16/90332* (2019.01);
(Continued)

(58) Field of Classification Search
CPC .... G10L 15/22; G06F 16/90332; G06O 50/01
(Continued)

(56) References Cited

U.S. PATENT DOCUMENTS 5,371,673 A    12/1994 Fan
7,076,737 B2    7/2006 Abbott et al.
(Continued)

FOREIGN PATENT DOCUMENTS

WO    2017052563 A1    3/2017

OTHER PUBLICATIONS

Richler, J., "Scientific Explanations for Why Spoilers are so Horrible" https://www.theatlantic.com/entertainment/archive/2013/03/scientific-explanations-for-why-spoilers-are-so-horrible/274227/ (Mar. 2013) pp. 1-7.
(Continued)

*Primary Examiner* — William J Deane, Jr.
(74) *Attorney, Agent, or Firm* — Tutunjian & Bitetto, P.C.; Michael A. Petrocelli (57) ABSTRACT

A method and system for determining whether a conversation topic induces stress in participants of the conversation that includes registering participants of a conversation with a conversation content control system, wherein said registering the participants includes providing a listing of social media accounts for each of the participants. The method may further include developing a baseline of avoidance topics from user content selected from the group consisting of capturing training conversation characterized into the avoidance topics by natural language processing (NLP), analyzing the social media accounts for content to be characterized into said avoidance topics, and combinations thereof. The method may further include monitoring real time conversation using natural language processing (NLP) to discern avoidance topics from the real time conversation.

20 Claims, 6 Drawing Sheets

(51) Int. Cl.
*G06F 16/9032* (2019.01)
*H04M 3/56* (2006.01)
*G06N 20/00* (2019.01)
*G10L 15/18* (2013.01)
*G06F 16/9035* (2019.01)
*G06Q 50/00* (2012.01)

(52) U.S. Cl.
CPC .......... *G06N 20/00* (2019.01); *G10L 15/1822* (2013.01); *H04M 3/568* (2013.01); *G06Q 50/01* (2013.01)

(58) Field of Classification Search
USPC ............................................ 379/202.01, 158
See application file for complete search history.

(56) References Cited

U.S. PATENT DOCUMENTS

| | | | |
|---|---|---|---|
| 7,103,806 | B1 | 9/2006 | Horvitz |
| 8,015,006 | B2 | 9/2011 | Kennewick et al. |
| 8,676,937 | B2 | 3/2014 | Rapaport et al. |
| 9,257,122 | B1 | 2/2016 | Cancro et al. |
| 9,762,719 | B2 * | 9/2017 | Tartz .................... G06F 3/005 |
| 10,321,195 | B1 | 6/2019 | Nasir |
| 10,515,630 | B1 * | 12/2019 | Benkreira ........... G10L 15/1815 |
| 2006/0106611 | A1 * | 5/2006 | Krasikov ............... G09B 19/04 704/270 |
| 2012/0236103 | A1 | 9/2012 | Cahill et al. |
| 2013/0117279 | A1 * | 5/2013 | Massey .................. G06Q 10/10 707/748 |
| 2014/0101244 | A1 | 4/2014 | Klein et al. |
| 2014/0122588 | A1 * | 5/2014 | Nimri ................. H04L 12/1831 709/204 |
| 2014/0214980 | A1 | 7/2014 | Jung |
| 2014/0297260 | A1 | 10/2014 | Allen |
| 2015/0172461 | A1 | 6/2015 | Cudak et al. |
| 2015/0381689 | A1 | 12/2015 | Ganesh et al. |
| 2016/0149956 | A1 | 5/2016 | Birnbaum et al. |
| 2016/0192166 | A1 * | 6/2016 | deCharms ............... H04L 67/18 348/14.02 |
| 2016/0212273 | A1 * | 7/2016 | Tsypnyatov .......... H04M 3/562 |
| 2017/0046033 | A1 * | 2/2017 | Boss ....................... H04B 1/385 |
| 2017/0097928 | A1 * | 4/2017 | Davis Jones ........... H04L 67/42 |
| 2017/0153703 | A1 * | 6/2017 | Yun ..................... G06F 3/03547 |
| 2017/0154049 | A1 | 6/2017 | Catalano et al. |
| 2018/0020095 | A1 * | 1/2018 | Skiba .................. G06Q 30/016 |
| 2018/0048767 | A1 * | 2/2018 | Tinsman ........... H04M 1/72519 |
| 2018/0097854 | A1 * | 4/2018 | Patel ................... H04L 65/1083 |
| 2018/0152759 | A1 | 5/2018 | Miller |
| 2018/0217661 | A1 * | 8/2018 | Gopalakrishnan ...... G06F 3/015 |
| 2018/0225279 | A1 | 8/2018 | Cruz Huertas et al. |
| 2018/0261211 | A1 * | 9/2018 | Dolan .................. G06F 16/00 |
| 2018/0262803 | A1 | 9/2018 | Benedetto |
| 2018/0293103 | A1 * | 10/2018 | Kalmus ................. G06N 3/084 |
| 2018/0356893 | A1 * | 12/2018 | Soni ..................... G06F 3/0346 |
| 2019/0015033 | A1 * | 1/2019 | Sahin .................. A61B 5/6803 |
| 2019/0018581 | A1 * | 1/2019 | Aronoff ................. H04L 51/10 |
| 2019/0087500 | A1 * | 3/2019 | Danyluk ................ G06F 16/48 |
| 2019/0130243 | A1 * | 5/2019 | Penubothula ....... G01C 21/3461 |
| 2019/0149584 | A1 | 5/2019 | DiBello et al. |
| 2019/0155388 | A1 * | 5/2019 | Lee ......................... G06F 1/163 |
| 2019/0205753 | A1 * | 7/2019 | Cai .......................... G06N 3/08 |
| 2019/0205872 | A1 | 7/2019 | Tourne et al. |
| 2019/0208270 | A1 | 7/2019 | Bates et al. |
| 2019/0214122 | A1 | 7/2019 | Lee et al. |
| 2019/0236628 | A1 | 8/2019 | Sudhindra et al. |
| 2019/0268873 | A1 * | 8/2019 | Levesque ............. G06F 3/0304 |
| 2019/0291010 | A1 | 9/2019 | Benedetto et al. |
| 2020/0097840 | A1 | 3/2020 | Burns et al. |
| 2020/0117275 | A1 * | 4/2020 | Chen ..................... G06F 3/016 |
| 2020/0196231 | A1 * | 6/2020 | Song ..................... H04W 48/18 |
| 2020/0293678 | A1 | 9/2020 | Feuz et al. |

OTHER PUBLICATIONS

List of IBM Patents or Patent Applications Treated as Related dated Jan. 8, 2019, 2 pages.
U.S. Office Action issued in U.S. Appl. No. 16/242,513 dated Sep. 24, 2020, pp. 1-40.

* cited by examiner

ANALYZING INFORMATION TO PROVIDE TOPIC AVOIDANCE ALERTS

BACKGROUND

Technical Field

The present invention generally relates to communications, and more particularly to managing the content of communications.

Description of the Related Art

People can be sensitive to different conversation topics. A participant to a conversation may not know that the other participants do not like discussing, or are uncomfortable with discussing certain topics, or that the other participants to the conversation have a different perspective on a topic of conversation.

SUMMARY

In accordance with an embodiment of the present invention, a method is provided for determining whether a topic of a conversation is causing at least one participant of the conversation to experience feelings of stress. The method may also indicate to a participant of the conversation that the subject of the conversation is causing at least one other part of the conversation to experience feelings of stress.

In one embodiment, a computer implemented method is provided for signaling whether a conversation topic induces stress that can begin with participants of a conversation registering with a conversation content control system, wherein registering the participants includes providing a listing of social media accounts for each of the participants. The method may continue with the conversation content control system developing a baseline of avoidance topics from user content selected from the group consisting of capturing real time conversation characterized into the avoidance topics by natural language processing (NLP), analyzing the social media accounts for content to be characterized into said avoidance topics, and combinations thereof. Following the generation of the baseline of avoidance topics, the conversation content control system can then monitor the conversation between the participants in real time using natural language processing (NLP) to discern avoidance topics from the conversation. In some embodiments, a signal is sent to participant when avoidance topics from the conversation substantially match values in the baseline of avoidance topics.

In another aspect, a system is provided for providing feedback to participants of a conversations. In one embodiment, the system for determining whether a conversation topic induces stress in participants of the conversation includes a registry including participants of a conversation, the registry including a listing of social media accounts for each of the participants; and a generator of avoidance topics captured from at least one of training conversation of the participants registered with the registry or captured by analyzing the social media accounts for content to be characterized into said avoidance topics. The system further includes a conversation monitor for avoidance topics that uses natural language processing (NLP) to discern avoidance topics from a real time conversation between the participants; and a signal generator to send a signal to at least one of the participants that avoidance topics from the conversation substantially match values in the baseline of avoidance topics.

In another aspect, the present disclosure provides a computer program product comprising a non-transitory computer readable storage medium having computer readable program code embodied therein for determining whether a topic of a conversation can at least one part of the conversation to experience feelings of stress. The method actuated by the computer program product may include registering participants of a conversation with a conversation content control system, wherein registering the participants includes providing a listing of social media accounts for each of the participants. In a following step, the method includes developing a baseline of avoidance topics from user content selected from the group consisting of capturing training conversation characterized into the avoidance topics by natural language processing (NLP), analyzing the social media accounts for content to be characterized into said avoidance topics, and combinations thereof. The method may also include monitoring real time conversation with the conversation content control system in real time using natural language processing (NLP) to discern avoidance topics from the real time conversation; and sending a signal to at least one of the participants that avoidance topics from the conversation substantially match values in the baseline of avoidance topics.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the disclosure provides methods, systems and computer program products that provide a determining whether a conversation topic induces stress in participants of the conversation. The methods, systems and computer program products described herein can leverages multiple internet of things (IoT) enabled devices to learn what topics a person is, or has, increased the stress level while engaging in conversation. When the probability is sufficient to reach a threshold that the individual has demonstrated a distaste for a topic, a bi-directional feedback is created to warn the individual and people he is engaged with when discussions of the event are going on. At this point, both parties are notified that this is a topic that probably should be avoided. The systems, methods and computer program products are now described with more detail with reference to FIGS. 1-9.

Figure 1:
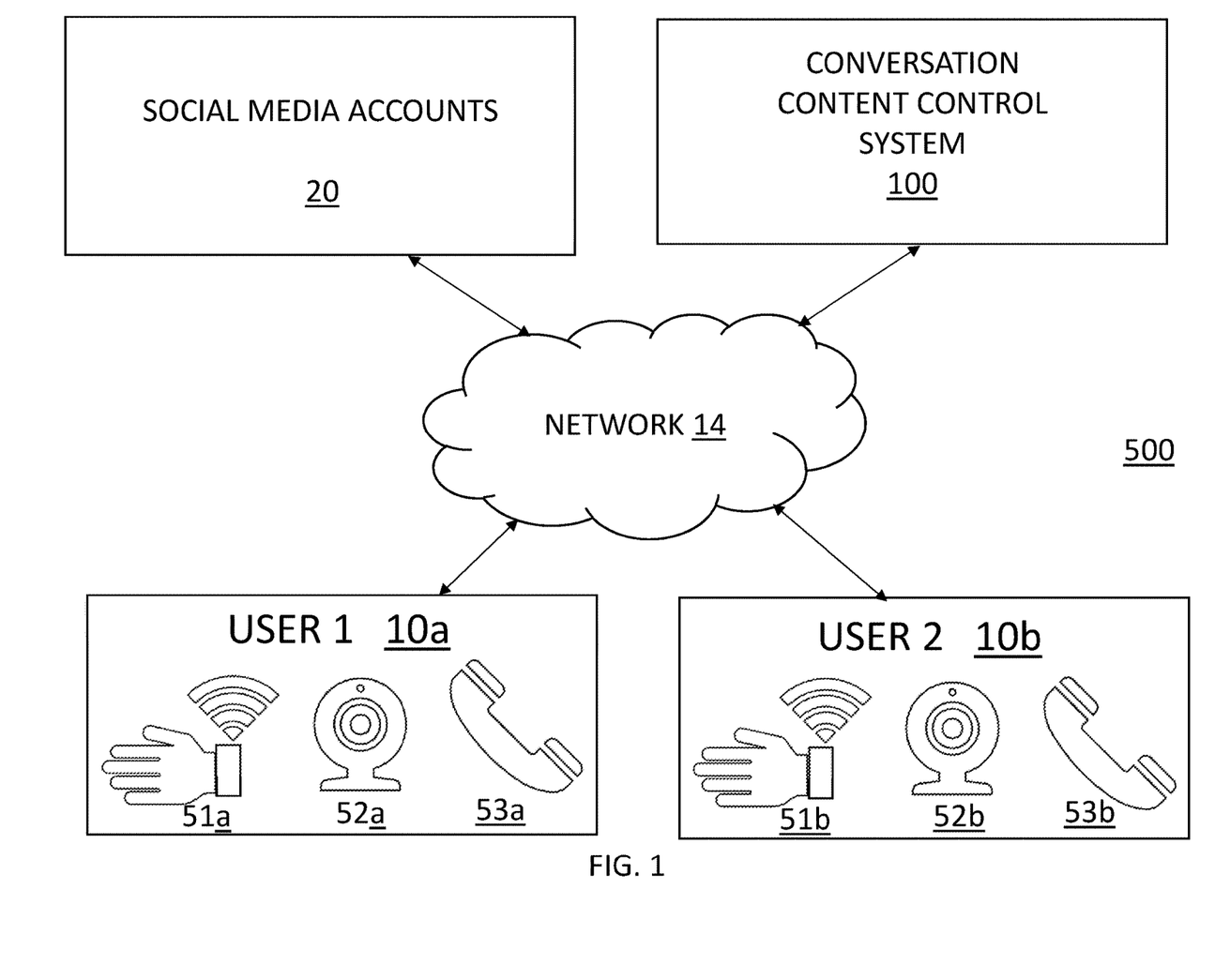
FIG. 1 is a diagram illustrating an example environment for determining whether a conversation topic induces stress in participants of the conversation, in accordance with one embodiment of the present disclosure.

FIG. 1 is a diagram illustrating an example environment for determining whether a conversation topic induces stress in participants of the conversation. The example environment includes a network 14 over which users, i.e., 10a, 10b, can communication via an at least two party communication session, through which conversation content control system 100 can provide feedback to participants of the conversations when the content of the conversation includes topics that at least one of the participants, e.g., users 10a, 10b, could find uncomfortable, distasteful, sensitive, or a combination thereof etc. The collective discomfort of a party to a topic of the conversation may be referred to as a "stress", or the topics that cause the aforementioned discomfort may be referred to as being "stressful".

As will be described in further detail throughout, participants 10a, 10b of a conversation to be monitored by the conversation content control system 100 register with the system, in which the registry information includes social media accounts 20 for each of the participants 10a, 10b. Each user 10a, 10b may also have social media accounts 20 that are also linked through the network 14 to the conversation content control layers 100. As will be discussed throughout the present disclosure, the conversation content control layer 100 can use the social media accounts 20 to determine for each participant to the conversation a list of conversation topics that are liked or disliked. Social media includes forms of electronic communication (such as websites for social networking and microblogging) through which users create online communities to share information, ideas, personal messages, and other content (such as videos). Social media are primarily Internet-lased tools for sharing and discussing information among human beings. In some example, the social media accounts 20 include a category of sites that is based on user participation and user-generated content. The social media accounts 20 can include social networking sites like LinkedIn™, Facebook™, or My Space™, social bookmarking sites like Del.icio.us™, social news sites like Digg™ or Simpy™, and other sites that are centered on user interaction.

In example embodiments, a user, e.g., participant to the conversation 10a, 10b, participates on a call with one or more other users via a communication device 53a, 53b that is communicatively coupled via the network 14 to the conversational content control system 100. Each user 10a, 10b may include a communication device 53a, 53b through which they can listen to the conversation and participate with the conversation.

The communication device 53a, 53b may comprise, but is not limited to, a phone, a wearable phone, a smartphone, tablet, laptop, multi-processor system, microprocessor-based or programmable consumer electronics, game console, set-top box, or any other device that the user may utilize to communicate over the network 14. In some embodiments, the communication device 53a, 53b may comprise a display module (not shown) to display information (e.g., in the form of user interfaces). In further embodiments, the communication device 53a, 53b may comprise one or more of a touch screen, camera, keyboard, and microphone.

Each user 10a, 10b, may include an IOT device, in which the IOT device 52a, 52b has the ability to measure the users conduct in determining whether the users 10a, 10b are listening to topics that could cause the users 10a, 10b to experience feelings of stress. The TOT devices 52a, 52b are in communication with the conversation content control system 100 through the network 14.

The Internet of things (IoT) is the network of physical devices, vehicles, home appliances, and other items embedded with electronics, software, sensors, actuators, and connectivity which enables these things to connect, collect and exchange data. The IoT devices 52a, 52b can be equipped with various types of sensors to collect information about themselves and their surroundings, and provide the collected information to the conversation content control system 100 over the network 14.

In some examples, the IOT devices 52a, 52b or a hub that the IOT devices 52a, 52b are in communication with include a cellular radio to establish a connection to the Internet via a cellular service such as a 4G (e.g., Mobile WiMAX, LTE) or 5G cellular data service. Alternatively, or in addition, the IOT devices or a hub that the IOT devices are in communication with include a may include a WiFi radio to establish a WiFi connection through a WiFi access point or router which couples the IOT devices 52a, 52b or IOT hub to the Internet (e.g., via an Internet Service Provider providing Internet service to the end user), which in turn connect to the conversation content control system 100/network 14. Of course, it should be noted that the underlying principles of the invention are not limited to any particular type of communication channel or protocol.

In one embodiment, the IoT devices 52a, 52b are ultra low-power devices capable of operating for extended periods of time on battery power (e.g., years). To conserve power, the local communication channels may be implemented using a low-power wireless communication technology such as Bluetooth Low Energy (LE). In this embodiment, each of the IoT devices 52a, 52b are equipped with Bluetooth LE radios and protocol stacks.

In one embodiment, the IoT platform includes an IoT app or Web application executed on user devices 10a, 10b to allow users to access and configure the connected IoT devices 52a, 52b, an IoT hub, and/or IoT service. The Web application may provide for communication over the network 14 to the conversation content control system 100.

One form of internet of things (IOT) that is suitable for use as the connected IoT devices 52a, 52b to the network 14 includes a microphone for measuring sounds, such as voices. More specifically, the IoT devices 52a, 52b including the microphone can record the conversation so that is can be analyzed for containing terms to topics that are on a list of avoidance topics. If the conversation includes terms related to the avoidance topics of the participants 10a, 10b, the conversation may be sensitive. More specifically, if the conversation includes terms related to the avoidance topics of the participants 10a, 10b, the conversation may be signaled by the conversation content control system 100 as including content that can induce stress in one of the participants to the conversation.

IoT devices 52a, 52b that can include microphone for measuring sounds may be virtual assistant type devices. Examples of these types of devices may include Cortana by Microsoft, Apple Ski, Google Assistant, Amazon Alexa, and Samsung Bixby. The Alexa virtual assistant type devices by Amazon are supported by a number of hardware factors, such as speakers (smart speakers), e.g., Amazon Echo, Amazon Echo plus, Amazon Echo Dot; televisions and media boxes; phones and tablet computers; laptop and desktop computers; smart home devices, such as lamps, light switches, thermostats, smoke alarms etc.; wearable and earphones and computer program products. The Cortana virtual assistant provided by Microsoft can be provided by computer operating systems such as Windows 10, Windows 10 Mobile, Windows Phone, iOS, Android, etc. The Cortana virtual assistance provided by Microsoft may also be available in a number of hardware form factors, such as smart speakers, headphones, video game systems, e.g., Xbox One, etc.

In some examples, the combination of the IoT devices 52a, 52b having a microphone for receiving user communications, i.e., for working with the conversation conduct control system 100, can include a system that has a universal vocabulary, or basic machine-to-machine language capabilities, that can allow IoT devices 52a, 52b to communicate with the conversation conduct control system 100, for providing communications by the users to be analyzed for their relevance to the subject of the multi-party conversation. For example, the vocabulary measured by the IoT devices 52a, 52b can be in plain English phrases or through some other form of abstraction. The vocabulary can be scalable such that new additions can be added to the vocabulary, e.g. for more complex actions. In one example, the vocabulary may be, or may include, an STN model for IoT devices.

The IOT devices 52a, 52b may also include a video camera for recording the motions of the participants 10a, 10b of the conversation being managed by the conversation conduct control system 100. This video information can be used to determine the participants' 10a, 10b conduct in response to terms and phrases relevant to the list of avoidance topics. If the conversation includes terms related to the avoidance topics of the participants 10a, 10b, the conversation may be sensitive. If the participants' 10a, 10b conduct recorded by video camera in response to avoidance topics is indicative of stress, the conduct confirms the stressful content of the conversation.

The IOT devices 52a, 52b may be the same devices, or different devices from the IOT devices 52a, 52b including the microphone for capturing sound and/or speech from the participants 10a, 10b. For example, the IOT devices 52a, 52b that include a video camera may be a computer-based hardware device that includes a processor, memory, and communication capabilities. Each of the IOT devices including the camera 52a, 52b may be coupled to the network 14 to communicate data between the one or more of the participants 10a, 10b, and the conversation content control system 100.

Some examples of the IOT devices 52a, 52b that can include a video camera for include a personal computer, a computer monitor, a phone, a laptop, a tablet computer, a lightbulb, a luminaire, a lighting system, a door lock, a water heater, a sprinkler system, an air-conditioner, a thermostat, an alarm clock, a window shade, a switch, a smoke alarm, an electrical outlet, an alarm, a personal proximity sensor, a door sensor, a biometric sensor, a mobile device, an automotive sensor, a cooking device, an electrical breaker, a personal alert sensor, a motion sensor, a calendar, a television, a radio, a radio frequency identification (RFID) tag/RFID detector, a vehicle, an electric vehicle charger, a distributed generator (e.g. solar panel), a distributed energy storage (e.g. battery), a thermometer, and combinations thereof.

Still referring to FIG. 1, each user 102a, 102b may also include a haptic feedback device 51a, 51b. The haptic feedback device 51a, 51b is also in communication with the conversation content control system 100 via the network 14. In some embodiments, the haptic feedback device 51a, 51b is the device that alerts the participants 10a, 10b, if the content of the conversation being monitored by the conversation content control system 100 is stressful to at least one of the participants 10a, 10b of the conversation. The haptic feedback device 51a, 51b in one embodiment includes an actuator, such as, e.g., an electric motor, an electro-magnetic actuator, a voice coil, a linear resonant actuator, a piezo-electric actuator, a shape memory alloy, an electro-active polymer, a solenoid, an eccentric rotating mass motor ("ERM") or a linear resonant actuator ("LRA"), a high bandwidth actuator, an electroactive polymer ("EAP") actuator, an electrostatic friction display, or an ultrasonic vibration generator. In addition to an actuator, the haptic feedback device 51a, 51b may be a non-mechanical or non-vibratory device such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc. Multiple haptic output devices with multiple haptic effects can generate a haptic effect.

The generated haptic effects can include a wide range of effects and technologies, including vibrations, deformation, squeezing, poking, stretching, surface friction, heat, etc. A device that generates haptic effects, and includes haptic feedback device 51a, 51b can be a wearable device (e.g., a bracelet, armband, glove, jacket, vest, pair of glasses, shoes, belt, etc.), a handheld device (e.g., a mobile phone, computer mouse, etc.), haptically enabled furniture (e.g., a chair, couch, etc.) or any other haptically enabled device. In one example, the haptic feedback device 51a, 51b is a smartwatch. In another example, the haptic feedback device 51a, 51b is a Fitbit™ activity tracker available from Fitbit Inc.

The haptic feedback device 51a, 51b can include cellular radio to establish a connection to the Internet via a cellular service such as a 4G (e.g., Mobile WiMAX, LTE) or 5G cellular data service to access the network 14; or the haptic feedback device 51a, 51b may include a WiFi radio to establish a WiFi connection through a WiFi access point or router which couples the haptic feedback device 51a, 51b to the Internet (e.g., via an Internet Service Provider providing Internet service to the end user), which in turn connect to the conversation content control system 100/network 14. Of course, it should be noted that the underlying principles of the invention are not limited to any particular type of communication channel or protocol. For example, in one embodiment, the haptic feedback device 51a, 51b may be equipped with Bluetooth LE radios and protocol stacks.

It is noted that the haptic feedback device 51a, 51b may be omitted. The signal to the users that the conversation includes stress inducing topics may be provided by any other device within the attention of the participants 10a, 10b of the conversation. For example, the signal may be auditory symbol that is emitted from the communication device through which the participants are interfacing with the conversation.

One or more portions of the network 14 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 14 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The conversation content control system 100 manages a communication session (also referred to as a "conversation" or "call") between the users 10a, 10b. While a total of two users or participants are shown in the conference call illustrated in FIG. 1, any number of users may be involved in the call.

As will be described in further detail throughout, the conversation content control system 100 has access to the social network accounts 20 to the participants 10a, 10b. Using a cognitive computing engine, the conversation content control system 100 can provide lists of avoidance topics from the content on the social network accounts 20. The lists of avoidance topics from the social network accounts 20 for the participants 10a, 10b can be used by the conversation content control system 100 to determine whether the content of a real time conversation being monitored is sensitive.

The conversation content control system 100 provides for recording the data provided by the communication devices 53a, 53b, and recording the data collected by the IOT devices 52a, 52b. The conversation content control system 100 analyzes the data, and determines if the content of the communications session, e.g., conversation, includes topics and/or subject matter that causes feelings of stress in one of the participants 10a, 10b. Thereafter, the conversation content control system 100 sends a feedback signal to the user specific haptic feedback device 51a, 51b of at least one of the participants 10a, 10b that the conversation being held includes topics that are causing feelings of stress to one of the participants 10a, 10b.

It is noted that the environment 500 shown in FIG. 1 is merely an example. For instance, not all components of the environment 500 may be shown. Additionally, any two or more of the systems, devices, or machines illustrated in FIG. 1 may be combined into a single system, device, or machine, and the functions described herein for any single system or machine may be subdivided among multiple systems or machines.

Any of the systems or machines (e.g., devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIGS. 2 and 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
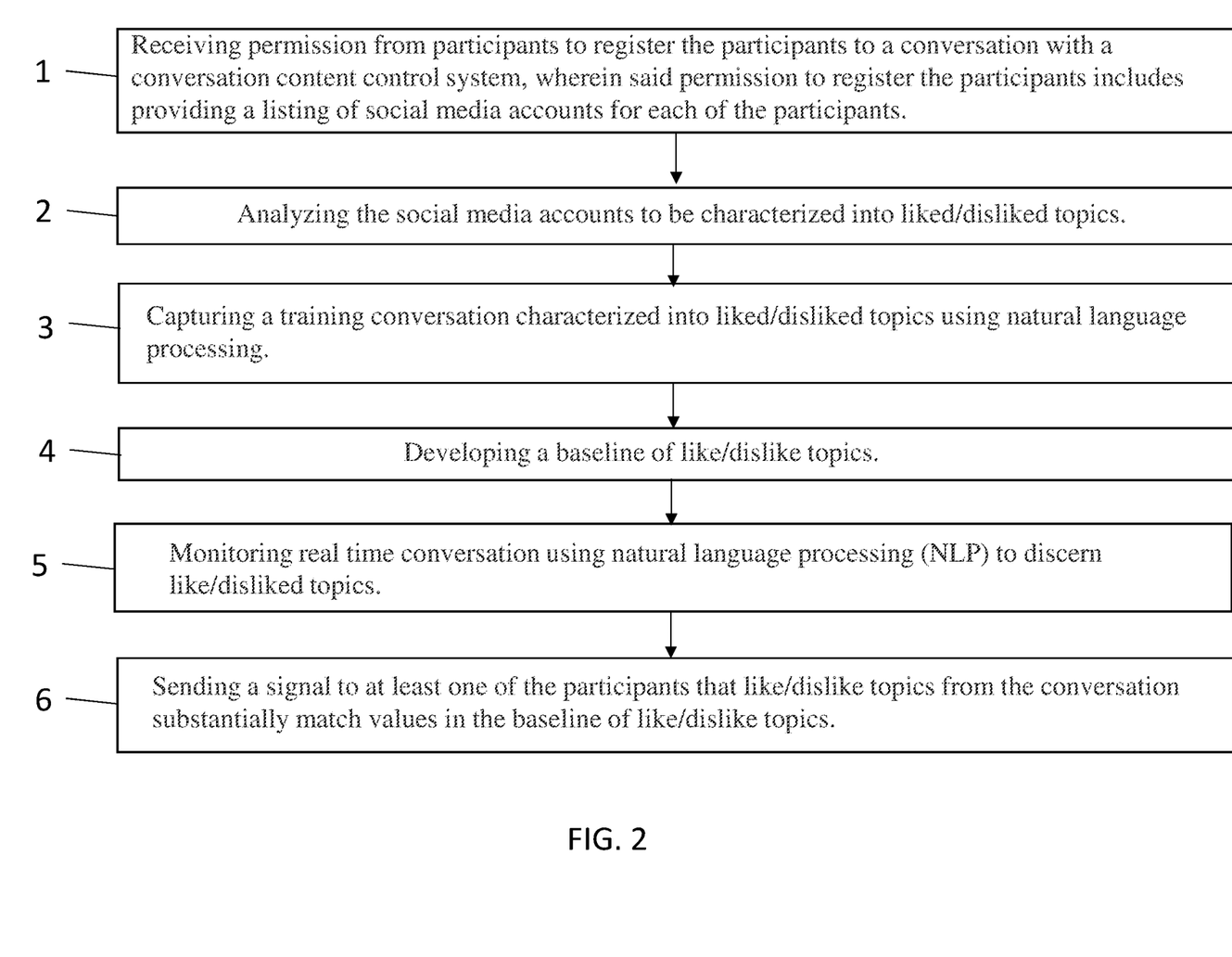
FIG. 2 is a block/flow diagram showing a method of determining whether a conversation topic induces stress in participants of the conversation, in accordance with an embodiment of the present invention.

FIG. 2 is a block/flow diagram showing a method of providing feedback to participants of multi-party phone conversations of their individual status in the conversation.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the method may begin at block 1, which can include registering participants 10a, 10b of a conversation with a conversation content control system 100, wherein registering the participants 10a, 10b includes providing a listing of social media accounts 20 for each of the participants 10a, 10b. Registering can also include opening a communications session with the conversation content control system 100 for at least two users (10a, 10b), wherein each of the at least two users has a user specific communications device 53a, 53b registered with the system, a user specific conduct measuring device, e.g., user specific IOT device 52a, 52b, registered with the system, and a user specific haptic feedback device 51a, 51b registered with the system. Registration means that addresses are provided to the conversation content control system 100 so that all the devices may be reached over the network 14. Registration for the user specific communications device 53a, 53b may include the entry of phone numbers by the users into the system 100. This information may be stored in a registration database, e.g., registry 30, that includes a plurality of user accounts, e.g., database of addresses for the user specific communications device 53a, 53b, database of addresses for the user specific TOT devices 52a, 52b, database of user specific social network accounts 20, and a user specific database of addresses for the user specific haptic feedback device 51a, 51b. Each of these databases can include a form of hardware memory for storing address data.

It is noted that the term "user specific" is meant to denote that each user has their own communications device having an address that is unique to the user, each user has their own conduct measuring device having an address that is unique to the user, each user has their own social network address, and each user has their own haptic feedback device having an address that is unique to the user.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual, i.e., user 10a, 10b, to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to FIG. 2, at block 2, the method can continue with analyzing the social media accounts 20 to be characterized into avoidance topics. In some embodiments, the conversation content controller system 100 can digest the social media accounts 20 of the participants 10a, 10b of the conversation, and can identify the topics that the participants 10a, 10b have strong opinions on.

Figure 3:
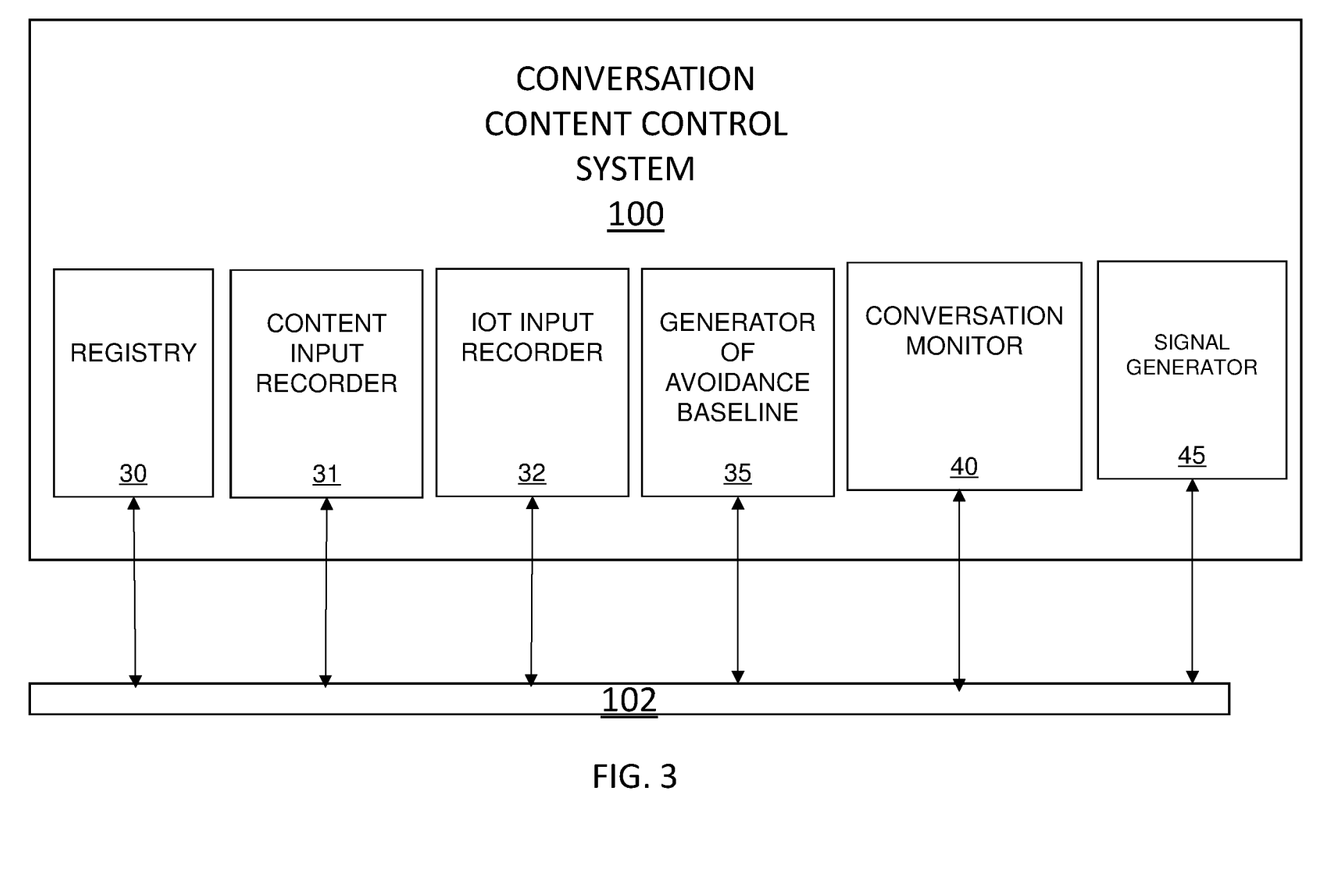
FIG. 3 is a block diagram illustrating a conversation content control system, in accordance with one embodiment of the present disclosure.

FIG. 3 is a block diagram illustrating a conversation content control system 100, which includes a generator of avoidance topics baseline 35. The generator of avoidance topics baseline 35 may employ at least one cognitive computing engine to digest the social media accounts 20 of the participants 10a, 10b to be characterized into avoidance topics, as described in block 2 of FIG. 2. The cognitive computing engine can employ at least one hardware device processor for performing a set of instruction stored on at least one memory device, in which the cognitive computing engine analyzes the data from the social media accounts 20 and assigns weights to the data. The cognitive computing engine that can perform a machine learning technique, a natural language processing technique, and/or other big data techniques. For example, data in the form of concepts, ideas, topics, opinions, theories, and other like positions from the social media can be weighed by the cognitive computer engine based upon the frequency of use of each entity of data. The more prevalent the usage the higher the weight assigned by the cognitive computing engine. The highest weighted entities of data scored by the cognitive computing engine from the social media accounts 20 provides the list of likes/avoidances topics. This can serve as the start of the avoidance baseline produced by the generator of avoidance baseline 35. The list of avoidance topics for the avoidance baseline can include concepts, ideas, topics, opinions, theories, and other like positions taken from the social media accounts 20.

Referring to FIG. 2, at block 3, the method may continue with capturing a training conversation characterized into avoidance topics using natural language processing. In some embodiments, the list of avoidance topics generated from the social media accounts 20 may be further elaborated upon with data provided from analysis of conversation recorded from the participants 10a, 10b. This conversation may be referred to as training conversation, as it is used in the development of a list of avoidance topics that is used as the baseline for a later monitoring step of the conversation. Referring to FIG. 1, training conversation may be recorded through communication devices 53a, 53b specific to the participants 10a, 10b. Referring to FIG. 3, the recorded content for the training conversation may be an input to the conversation content control system 100 via an input through a content input recorder 31. The training conversation may be analyzed using natural language processing (NLP), or another form of artificial intelligence, for liked and avoidance concepts, subjects, and ideas, etc. Similar to the analysis of the social media accounts, the training conversation can be analyzed to provide a list of avoidance topics.

In one example, the analysis of the training conversation may include recording content of the training conversation in real time; analyzing terms from the training conversation using a cognitive computing engine, e.g., generator of avoidance baseline 35, to provide the avoidance topics; and confirming said avoidance topics with conduct measuring devices measuring conduct of said participants 10a, 10b to the training conversation during said avoidance topics.

In one embodiment, conduct measuring devices, e.g., IoT devices 52, 52b can measure the conduct of the participants 10a, 10b, and can capture conduct at the time new subject matter is introduced to the conversation that could change the conversation to being a stress inducing conversation requiring signaling to all the parties. The user specific conduct measuring device, e.g., internet of things (IOT) device 52a, 52d, can include at least one of a camera and a microphone, for the at least two users.

Referring to FIG. 3, the recording and storage of the conduct of users 102a, 102b, 102c, 102d measured by the user specific conduct measuring device, e.g., internet of things (IOT) device 52a, 52b, may be provided by the IOT input recorder 32 of the conference system 100 depicted in FIG. 3. The IOT input recorder 30 may include any type of memory and/or media capable of recording video and/or audio transmissions.

The list prepared from the training conversation can be compared with the list prepared from the social media accounts. An aggregated list provided by both data sources provides increased accuracy of what terms, subjects and phrases by the participants' 10a, 10b can elevate the stress of the participants 10a, 10b to the conversation. Combining the lists of avoidance topics can be the products of operations of the generator of avoidance baseline 35 of the conversation content control system 100 that is depicted in FIG. 3.

Referring to FIG. 2, at this step of the process sequence, a baseline of avoidance topics has been developed as illustrated in block 4.

At block 5 of FIG. 2, the method can continue with the monitoring stage of the process flow. At block 5, of FIG. 2, the monitoring stage begins, in which the conversation content control system 100 receives real time input of conversation between the parties 10a, 10b; employs natural language processing (NLP) of the real time conversation to extract avoidance topics from the real time input of conversation; and employs the baseline of avoidance topics developed at blocks 2, 3 and 4 to determine if the content of the conversation is stress inducing.

In some embodiments, monitoring the real time conversation with the conversation content control system 100 at block 5 of the method of FIG. 2 includes recording content of the real time conversation between the parties 10a, 10b; and analyzing terms from the real time conversation using a cognitive computing engine to provide the avoidance topics. Similar to the analysis of the training conversation at block 3 of the method depicted in FIG. 2, the real time conversation is recorded from the user specific communications device 53a, 53b. Referring to FIG. 3, the monitoring stage of the process flow may be conducted by a conversation monitor 40 of the conversation content control system 100. The conversation monitor 40 may include a cognitive computing engine can employ at least one hardware device processor for performing a set of instruction stored on at least one memory device, in which the cognitive computing engine analyzes the data from real time conversations and assigns weights to the data. The cognitive computing engine that can perform a machine learning technique, a natural language processing technique, and/or other big data techniques. For example, data in the form of concepts, ideas, topics, opinions, theories, and other like positions from the social media can be weighed by the cognitive computer engine based upon the frequency of use of each entity of data. The more prevalent the usage the higher the weight assigned by the cognitive computing engine. The highest weighted entities of data scored by the cognitive computing engine from the real time conversation during the monitoring provides avoidance topics from the real time conversation analysis to be compared to the avoidance baseline produced by the generator of avoidance baseline 35.

In some embodiments, the monitoring of the real time conversation at block 5 of the method depicted in FIG. 2 may further include confirming the avoidance topics with conduct measuring devices, e.g., IoT devices 52a, 52b, measuring conduct of the participants 10a, 10b to the real time conversation.

Referring to FIG. 2, at block 6, the method may conclude with sending a signal to at least one of the participants that avoidance topics from the real time conversation substantially match values in the baseline of avoidance topics. The conversation content control system 100 sends a signal that the content of a conversation is causing stress when one of the terms of the avoidance topics from the analysis of the real time conversation of the monitoring at block 5 is substantially the same as an avoidance term on the baseline of avoidance topics that is provided by blocks 2-4 of FIG. 2. Referring to FIG. 3, the signal that the conversation is causing stress is sent by a signal generator 45 of the conversation content control system 100. In one embodiment, the signal causes the activation of a haptic device that is worn 51a, 51b by the participant 10a, 10b that is transmitting the portion of the conversation including said at least one of the avoidance topic. In some embodiments, the haptic feedback device 51a, 51b asserts a signal by physical interaction with the user by an electric motor, an electromagnetic actuator, a linear resonant actuator, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") or a combination thereof.

In some embodiments, instead of the haptic feedback device, and audible tone may be emitted by the user specific communications device 53a, 53b to signal that a stressful conversation is occurring. In some embodiments, the signal is sent to all the participants of the conversation. In other embodiments, the signal can be sent to only the party transmitting the offending portions.

FIG. 3 is a block diagram illustrating a conversation content control system 100. In one embodiment, the system for determining whether a conversation topic induces stress in participants of the conversation may include a registry 30 including participants of a conversation, the registry 30 including a listing of social media accounts 20 for each of the participants; and a generator of avoidance topics 35 captured from at least one of training conversation of the participants registered with the registry or captured by analyzing the social media accounts for content to be characterized into said avoidance topics. In some embodiments, the system includes conversation monitor 40 for avoidance topics that uses natural language processing (NLP) to discern avoidance topics from a real time conversation between the participants; and a signal generator 45 to send a signal to at least one of the participants that avoidance topics from the conversation substantially match values in the baseline of avoidance topics. The conversation content control system 100 may be used in combination with the method described in FIG. 2. Some elements of the conversation content control system 100 have already been discussed in the description of FIG. 2. It is noted that each of the aforementioned elements of the conversation content control system 100 are operatively coupled via a system bus 102.

Figure 4:
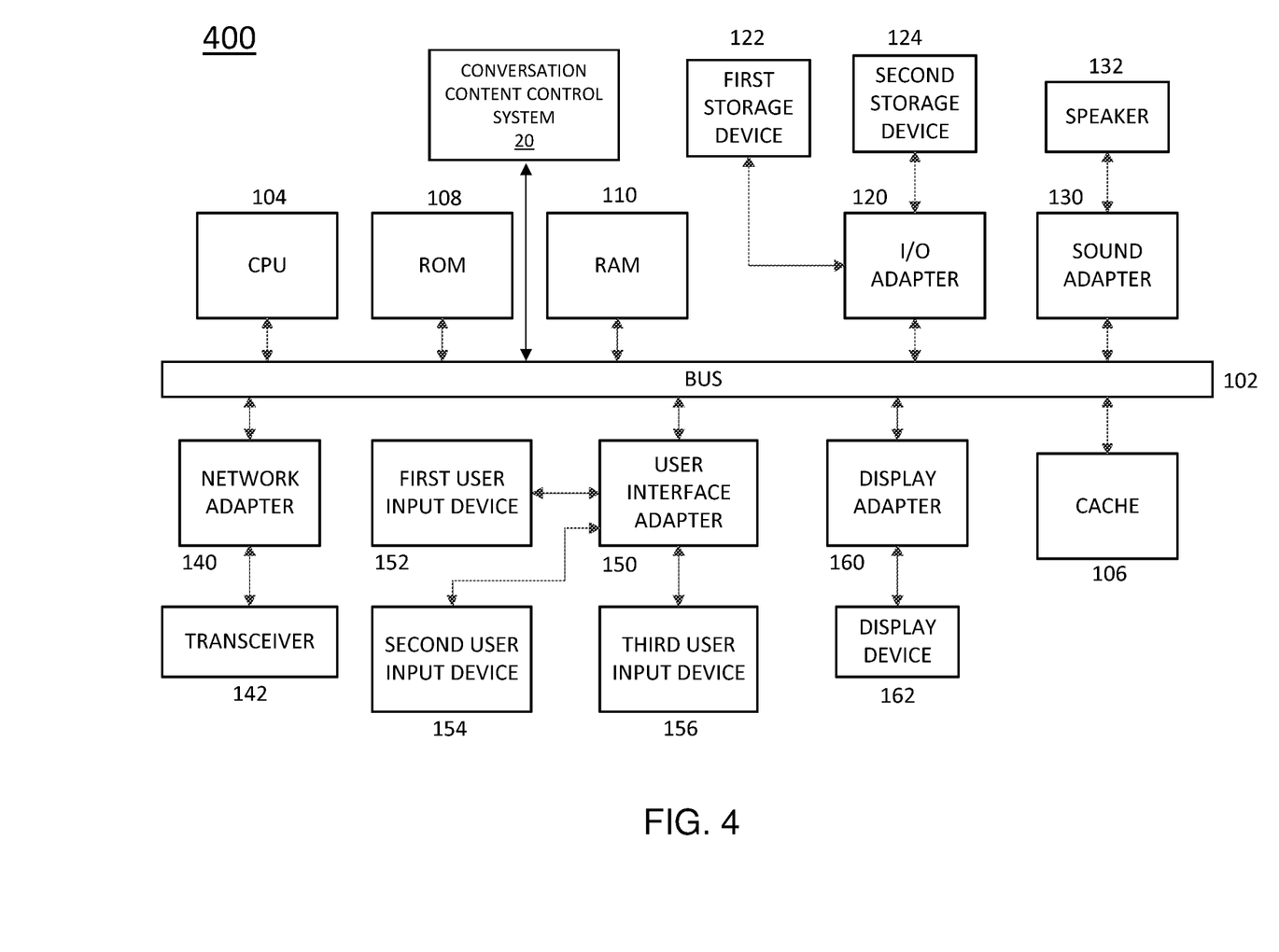
FIG. 4 is a block diagram illustrating a system that can incorporate the conversation content control system depicted in FIG. 3 for providing feedback to participants of multi-party phone conversations of their individual status in the conversation, in accordance with one embodiment of the present disclosure.

The conversation content control system 100 may be integrated into the processing system 400 depicted in FIG. 4. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for determining whether a conversation topic induces stress in participants of the conversation. The method actuated by the computer program product may include registering participants of a conversation with a conversation content control system, wherein said registering the participants includes providing a listing of social media accounts for each of the participants; developing with the conversation content control system a baseline of avoidance topics from user content selected from the group consisting of capturing training conversation characterized into the avoidance topics by natural language processing (NLP), analyzing the social media accounts for content to be characterized into said avoidance topics, and combinations thereof; monitoring real time conversation with the conversation content control system in real time using natural language processing (NLP) to discern avoidance topics from the real time conversation; and sending a signal to at least one of the participants that avoidance topics from the conversation substantially match values in the baseline of avoidance topics.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
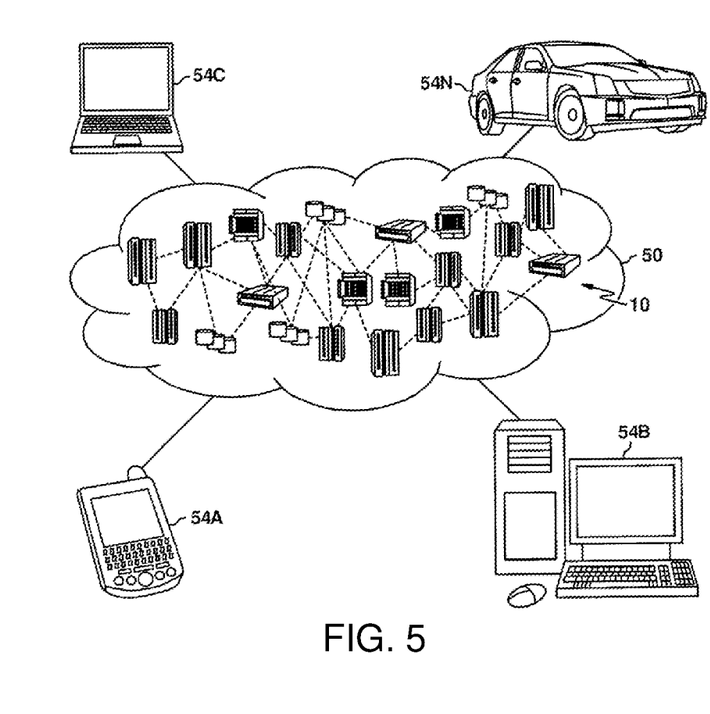
FIG. 5 depicts a cloud computing environment according to an embodiment of the present disclosure.

Referring now to FIG. 8, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 6:
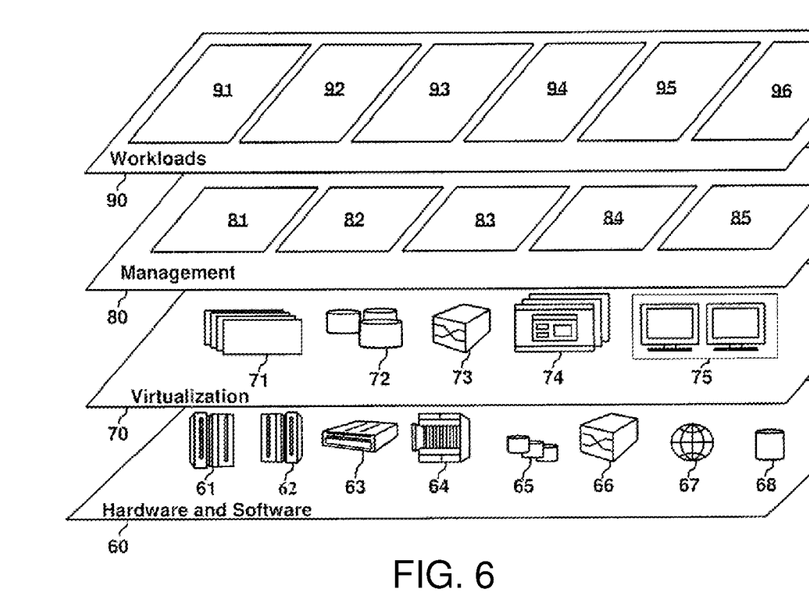
FIG. 6 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the conferencing system 100, which is described with reference to FIGS. 1-9.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a haptic feedback to modify behavior during phone calls (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method for analyzing whether a conversation topic induces stress in participants of the conversation comprising:
receiving permission from participants to register the participants to a conversation with a conversation content control system, wherein said permission to register the participants includes providing a listing of social media accounts for each of the participants;
developing with the conversation content control system a baseline of avoidance topics from user content selected from the group consisting of capturing training conversation characterized into the avoidance topics by natural language processing (NLP), analyzing the social media accounts for content to be characterized into said avoidance topics, and combinations thereof;
monitoring real time conversation with the conversation content control system in real time using natural language processing (NLP) and video monitoring motions of the participants in the real time conversation to discern avoidance topics from the real time conversation; and
sending a signal to at least one of the participants that avoidance topics from the conversation substantially match values in the baseline of avoidance topics.

2. The computer implemented method of claim 1, wherein said registering participants to the conversation with a conversation content control system opens a conference call monitored by the conversation control system.

3. The computer implemented method of claim 1, wherein the capturing in real time conversation characterized into the avoidance topics by natural language processing (NLP) comprises:
recording content of the training conversation in real time;
analyzing terms from the training conversation using a cognitive computing engine to provide the avoidance topics; and
confirming said avoidance topics with conduct measuring devices measuring conduct of said participants to the training conversation during said avoidance topics.

4. The computer implemented method of claim 1, wherein the specific conduct measuring device is an internet of things (IOT) device including at least one of a camera and a microphone.

5. The computer implemented method of claim 4, wherein the specific conduct measuring device is a voice assistant.

6. The computer implemented method of claim 1, wherein the social media accounts are internet based tools for sharing information about the participants.

7. The computer implemented method of claim 1, wherein the signal to at least one of the participants is to a participant that is transmitting a portion of the conversation including at least one of the avoidance topic.

8. The computer implemented method of claim 7, wherein said signal to the at least one of the participants that avoidance topics from the conversation substantially match values in the baseline of avoidance topics comprises an audible tone transmitted by the communications device of the participant that is transmitting the portion of the conversation including said at least one of the avoidance topic.

9. The computer implemented method of claim 1, wherein said monitoring the real time conversation with the conversation content control system comprises:
recording content of the real time conversation;
analyzing terms from the real time conversation using a cognitive computing engine to provide the avoidance topics; and confirming said avoidance topics with conduct measuring devices measuring conduct of said participants to the real time conversation during said avoidance topics.

10. The computer implemented method of claim 7, wherein said signal to the at least one of the participants that avoidance topics from the conversation substantially match values in the baseline of avoidance topics comprises an activation of a haptic device that is worn by the participant that is transmitting the portion of the conversation including said at least one of the avoidance topic.

11. The computer implemented method of claim 10, wherein the user specific haptic feedback device asserts a signal by physical interaction with the user by an electric motor, an electro-magnetic actuator, a linear resonant actuator, a piezoelectric actuator, a shape memory alloy, an electro-active polymer, a solenoid, an eccentric rotating mass motor ("ERM"), a linear resonant actuator ("LRA"), a high bandwidth actuator, an electroactive polymer ("EAP") actuator, an electrostatic friction display, an ultrasonic vibration generator, an electrostatic friction ("ESF") device, and ultrasonic surface friction ("USF") or a combination thereof.

12. The computer implemented method of claim 11, wherein the specific haptic feedback device has a form factor to be worn on a wrist of the user.

13. A system for determining whether a conversation topic induces stress in participants of the conversation comprising:
a registry including participants of a conversation, the registry including a listing of social media accounts for each of the participants;
a generator of avoidance topics captured from at least one of training conversation of the participants registered with the registry or captured by analyzing the social media accounts for content to be characterized into said avoidance topics;
a conversation monitor for avoidance topics that uses natural language processing (NLP) and video monitoring motions of the participants in the conversation to discern avoidance topics from a real time conversation between the participants; and
a signal generator to send a signal to at least one of the participants that avoidance topics from the conversation substantially match values in the baseline of avoidance topics.

14. The system of claim 13, wherein the generator of avoidance topics comprises:
an input for receiving audio content of a training conversation in real time;
a natural language processing engine to analyze terms from the training conversation to provide the avoidance topics; and
a input for receiving conduct measured by conduct measuring devices of the participants for confirming said avoidance topics.

15. The system of claim 13, wherein the generator of avoidance topics further includes a cognitive computing engine for analyzing terms from the social media accounts of the participants.

16. The system of claim 14, wherein the conduct measuring device is an internet of things (IOT) device including at least one of a camera and a microphone.

17. The system of claim 14, wherein said monitoring the real time conversation with the conversation content control system comprises:
an input for receiving audio content of a real time conversation;
a natural language processing engine to extract terms indicative of avoidance topics from the real time conversation;
an input for receiving stress conduct measured by conduct measuring devices of the participants during said real time conversation to confirm said avoidance topics; and
a conversation topic alert generator that issues a signal for alert of conversation stress when at least one of said avoidance topics from said real time conversation substantially match avoidance topics from said training conversation.

18. A computer program product comprising a non-transitory computer readable storage medium having computer readable program code embodied therein for determining whether a conversation topic induces stress in participants of the conversation, the method comprising:
receiving permission from participants to register the participants to a conversation with a conversation content control system, wherein said permission to register the participants includes providing a listing of social media accounts for each of the participants;
developing with the conversation content control system a baseline of avoidance topics from user content selected from the group consisting of capturing training conversation characterized into the avoidance topics by natural language processing (NLP), analyzing the social media accounts for content to be characterized into said avoidance topics, and combinations thereof;
monitoring real time conversation with the conversation content control system in real time using natural language processing (NLP) and video monitoring motions of the participants in the real time conversation to discern avoidance topics from the real time conversation; and
sending a signal to at least one of the participants that avoidance topics from the conversation substantially match values in the baseline of avoidance topics.

19. The computer program product of claim 18, wherein said registering participants to the conversation with a conversation content control system opens a conference call monitored by the conversation control system.

20. The computer program product of claim 18, wherein the capturing in real time conversation characterized into the avoidance topics by natural language processing (NLP) comprises:
recording content of the training conversation in real time;
analyzing terms from the training conversation using a cognitive computing engine to provide the avoidance topics; and
confirming said avoidance topics with conduct measuring devices measuring conduct of said participants to the training conversation during said avoidance topics.

* * * * *